(12) United States Patent
Huang et al.

(10) Patent No.: US 8,509,037 B1
(45) Date of Patent: Aug. 13, 2013

(54) LAYERED OPTICAL WAVEGUIDE AND NEAR FIELD TRANSDUCER

(75) Inventors: Xiaoyue Huang, Eden Praire, MN (US); Chubing Peng, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/454,999

(22) Filed: Apr. 24, 2012

(51) Int. Cl.
*G11B 11/00* (2006.01)

(52) U.S. Cl.
USPC ............. 369/13.24; 369/13.33; 369/112.27; 360/59

(58) Field of Classification Search
None
See application file for complete search history.

(56) References Cited

U.S. PATENT DOCUMENTS

| | | | |
|---|---|---|---|
| 5,987,046 A | 11/1999 | Kobayashi et al. | |
| 8,200,054 B1 * | 6/2012 | Li et al. | 369/13.3 |
| 2006/0090178 A1 | 4/2006 | Stipe | |
| 2006/0143635 A1 | 6/2006 | Liu et al. | |
| 2008/0239541 A1 | 10/2008 | Shimazawa et al. | |
| 2009/0244778 A1 | 10/2009 | Hasegawa et al. | |
| 2010/0165822 A1 | 7/2010 | Balamane et al. | |
| 2010/0321815 A1 | 12/2010 | Zhou et al. | |

* cited by examiner

*Primary Examiner* — Muhammad N Edun
(74) *Attorney, Agent, or Firm* — Hollingsworth Davis, LLC

(57) ABSTRACT

A waveguide extends away from a media-facing surface. The waveguide includes top and bottom cladding layers and a core disposed therebetween. The core includes a middle core layer and an outside core layer having respective first and second indices of refraction. The first index of refraction is smaller than the second index of refraction. A near field transducer is disposed within the middle core layer proximate the media-facing surface.

17 Claims, 10 Drawing Sheets

| No. | Bot Cladding | Core | Dimension [nm] | Top Cladding | NFT location | NFT to B-Clad spacing [nm] | FOM to POR* | Core Spec | Structure | Clad Symmetric |
|---|---|---|---|---|---|---|---|---|---|---|
| 1 | Al$_2$O$_3$ | Ta$_2$O$_5$ | 125 | Al$_2$O$_3$ | Al$_2$O$_3$ | 145 | 100.0% | Ta$_2$O$_5$ | out-of-center | Y |
| 2 | Al$_2$O$_3$ | Ta$_2$O$_5$+Y$_2$O$_3$ | 80+75 | Al$_2$O$_3$ | Y$_2$O$_3$ | 100 | 136.0% | Ta$_2$O$_5$ | out-of-center | N |
| 3 | SiO$_2$ | TiO$_x$+Y$_2$O$_3$+TiO$_x$ | 50+40+50 | SiO$_2$ | Y$_2$O$_3$ | 70 | 199.5% | TiO$_x$ | in-center | Y |
| 4 | SiO$_2$ | TiO$_x$+Y$_2$O$_3$+TiO$_x$ | 60+40+40 | Al$_2$O$_3$ | Y$_2$O$_3$ | 80 | 180.0% | TiO$_x$ | in-center | N |
| 5 | SiO$_2$ | Ta$_2$O$_5$+Y$_2$O$_3$+Ta$_2$O$_5$ | 80+40+50 | Al$_2$O$_3$ | Y$_2$O$_3$ | 100 | 163.3% | Ta$_2$O$_5$ | in-center | N |
| 6 | SiO$_2$ | Ta$_2$O$_5$+Y$_2$O$_3$+Ta$_2$O$_5$ | 50+40+50 | SiO$_2$ | Y$_2$O$_3$ | 70 | 189.9% | Ta$_2$O$_5$ | in-center | Y |
| 7 | SiO$_2$ | Ta$_2$O$_5$+TiO$_x$+Y$_2$O$_3$ | 40+40+75 | SiO$_2$ | Y$_2$O$_3$ | 100 | 179.1% | Ta$_2$O$_5$+TiO$_x$ | out-of-center | Y |
| 8 | SiO$_2$ | Ta$_2$O$_5$+TiO$_x$+Y$_2$O$_3$ | 40+40+100 | Al$_2$O$_3$ | Y$_2$O$_3$ | 100 | 165.7% | Ta$_2$O$_5$+TiO$_x$ | out-of-center | N |
| 9 | SiO$_2$ | TiO$_x$+Y$_2$O$_3$ | 60+100 | Al$_2$O$_3$ | Y$_2$O$_3$ | 80 | 167.3% | TiO$_x$ | out-of-center | N |
| 10 | SiO$_2$ | Ta$_2$O$_5$+Y$_2$O$_3$ | 80+75 | Al$_2$O$_3$ | Y$_2$O$_3$ | 100 | 153.0% | Ta$_2$O$_5$ | out-of-center | N |
| 11 | SiO$_2$ | TiO$_x$+Y$_2$O$_3$ | 80+75 | SiO$_2$ | Y$_2$O$_3$ | 100 | 173.0% | TiO$_x$ | out-of-center | Y |
| 12 | SiO$_2$ | Ta$_2$O$_5$+Y$_2$O$_3$ | 80+75 | SiO$_2$ | Y$_2$O$_3$ | 100 | 174.0% | Ta$_2$O$_5$ | out-of-center | Y |

*FIG. 8*

LAYERED OPTICAL WAVEGUIDE AND NEAR FIELD TRANSDUCER

BACKGROUND

The present disclosure relates to optical components used in applications such as heat assisted magnetic recording (HAMR). A HAMR device utilizes a magnetic recording media (e.g., hard drive disk) that is able to overcome superparamagnetic effects that limit the areal data density of typical magnetic media. In order to record on this media, a small portion of the media is locally heated while being written to by a magnetic write head. A coherent light source such as a laser may provide the energy to create these hot spots, and optical components, e.g., built in to a slider that houses the write head, are configured direct this energy onto the media.

SUMMARY

One embodiment described herein is directed to an apparatus having a waveguide extending away from a media-facing surface. The waveguide includes top and bottom cladding layers and a core disposed therebetween. The core includes a middle core layer and an outside core layer having respective first and second indices of refraction. The first index of refraction is smaller than the second index of refraction. A near field transducer is disposed within the middle core layer proximate the media-facing surface.

In another embodiment, an apparatus includes a waveguide extending away from a media-facing surface. The waveguide has top and bottom cladding layers and a core disposed therebetween. The top and bottom cladding layers have respective top and bottom indices of refraction. The top index of refraction is higher than the bottom index of refraction, and the core has a higher index of refraction than both the top and bottom indices of refraction. The apparatus includes a near-field transducer disposed in the top cladding layer proximate the media-facing surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 8 is a table summarizing analysis of various waveguide configurations according to example embodiments;

DETAILED DESCRIPTION

Figure 1:
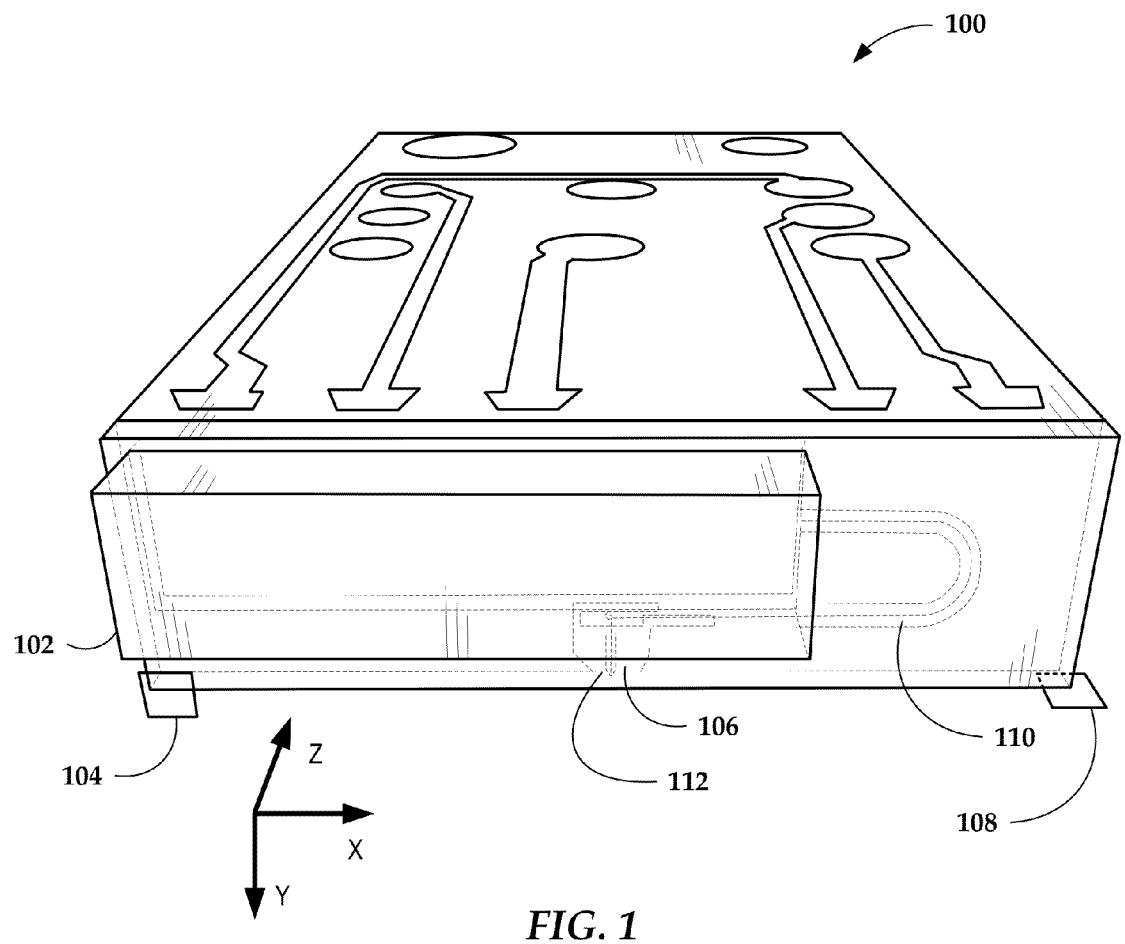
FIG. 1 is a perspective view of a thermal assisted recording slider utilizing a near field transducer and waveguide according to an example embodiment.

The present disclosure relates to a light delivery system for use in applications where a beam of highly focused and relatively powerful electromagnetic energy is desired. As mentioned above, one such application is in thermal/heat assisted magnetic recording, referred to herein as HAMR. In reference now to FIG. 1, a perspective view shows an example HAMR slider 100. This example slider 100 includes an edge-emitting laser diode 102 integrated into a trailing edge surface 104 of the slider 100. The laser diode 102 is proximate to a HAMR read/write head 106, which has one edge on an air bearing surface (ABS) 108 of the slider 100. The ABS 108 faces and is held proximate to a moving media surface (not shown) during device operation.

The laser diode 102 provides electromagnetic energy to heat the media surface at a point near to the read/write head 106. Optical coupling components, such as a waveguide 110, are formed integrally within the slider device 100 to deliver light from the laser 102 to the media. In particular, a local waveguide and NFT 112 may be located proximate the read/write head 106 to provide local heating of the media during write operations. While the laser diode 102 in this example is an integral, edge firing device, it will be appreciated that the waveguide/NFT 112 may be applicable to any light source and light delivery mechanisms. For example, surface emitting lasers (SEL) may be used instead of edge firing lasers, and the slider may use any combination of integrated and external lasers.

A HAMR device utilizes the types of optical devices described above to heat a magnetic recording media (e.g., hard disk) in order to overcome superparamagnetic effects that limit the areal data density of typical magnetic media. In order to record on this media, a small portion of the media is locally heated above the Curie temperature while being written to by a magnetic write head. A coherent light source such as a laser may provide the energy to create these hot spots, and optical components, e.g., built in to a slider that houses the write head, are configured direct this energy onto the media.

When applying light to a HAMR medium, the light is concentrated into a small hotspot over the track where writing takes place. To create this small hot spot, energy from a light source (such as a laser that is integral to or separate from the write head) may be launched into a waveguide integrated into a hard drive head. The light propagates through the waveguide and may be coupled to an optical NFT, e.g., either directly from the waveguide or by way of a focusing element.

Figure 2:
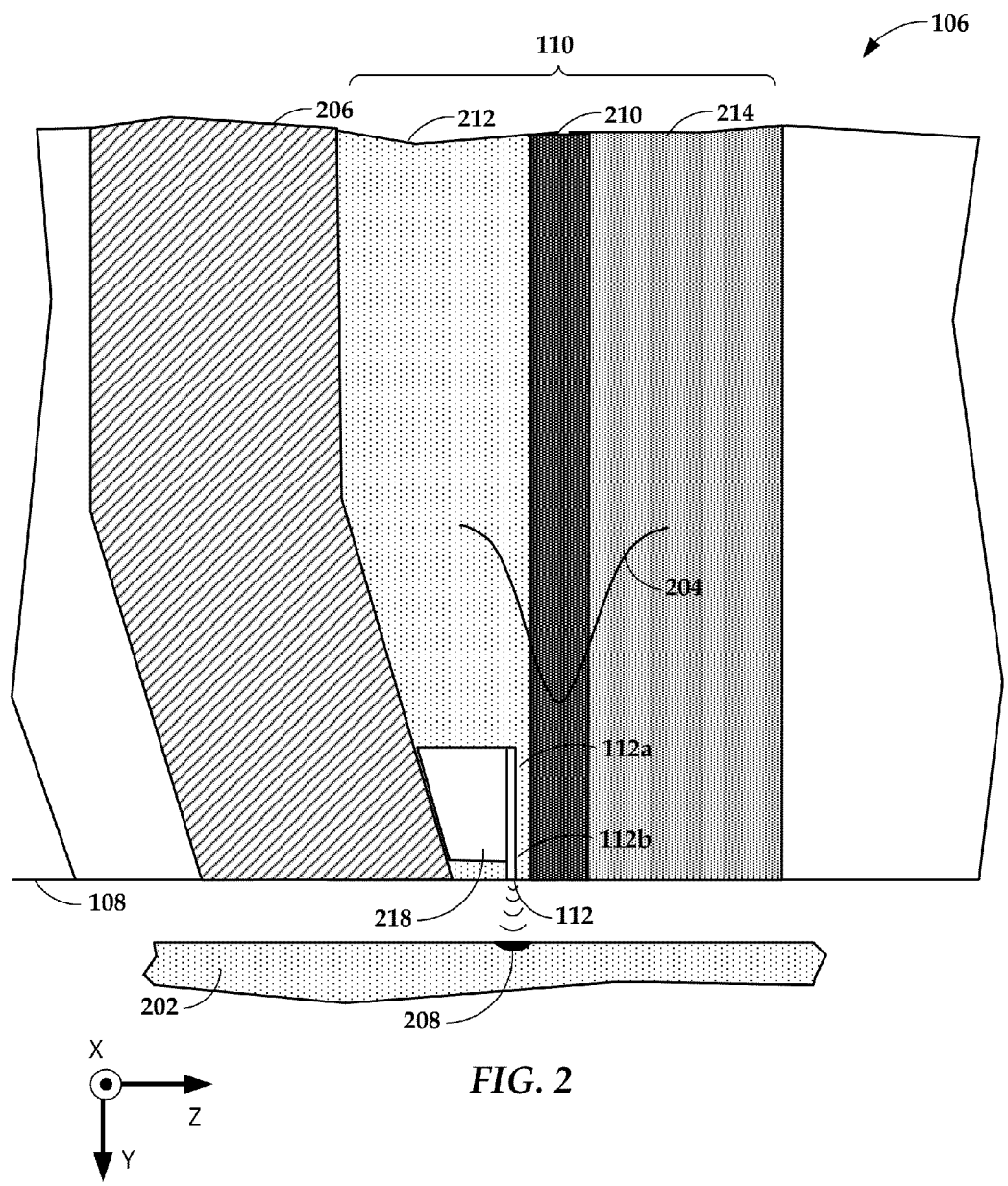
FIG. 2 is a cross-sectional view of a waveguide, write pole, and near-field transducer according to an example embodiment.

In FIG. 2, a cross-sectional view illustrates portions of a read/write head 106 according to an example embodiment. In this view, the ABS 108 and NFT 112 are proximate to a surface of magnetic medium 202, e.g., a magnetic disk. The waveguide 110 delivers electromagnetic energy 204 to the NFT 112, which directs the energy to create a small hotspot 208 on the medium 202. A magnetic write pole 206 causes changes in magnetic flux near the ABS 108 in response to an applied current. Flux from the write pole 206 changes a magnetic orientation of the hotspot 208 as the hotspot 208 moves past the write pole 206 in the downtrack direction (Z-direction).

The waveguide 101 and NFT 112 may be formed integrally within a slider that houses the read-write head 106. These and other optical elements used in HAMR recording heads are generally known as integrated optics devices. The field of integrated optics relates to the construction of optics devices on substrates, sometimes in combination with electronic components, to produce functional systems or subsystems. Integrated optics are formed using processes similar to those used for semiconductor production, e.g., layer deposition.

For example, the waveguide 110 may transfer light from a laser (e.g., laser diode 102 in FIG. 1) to the NFT 112 via dielectric materials that are built up on a substrate using layer deposition techniques (e.g., atomic layer deposition, photoresist etching, chemical-mechanical planarization, etc.). The waveguide may be formed as a layer of materials, with middle layer 210 having a refractive index $n_1$, and top and bottom layers 212, 214 of refractive indices $n_2$ and $n_3$. In configurations such as where $n_1 > n_2$, and $n_1 > n_3$, the middle layer 210 acts as a core and the top and bottom layers 212, 214 act as cladding (similar to an optic fiber), and therefore light will propagate efficiently through the waveguide 110.

The NFT 112, write pole 206, and other illustrated components may be formed using similar layer deposition techniques as the waveguide 110. Generally, a plasmonic device such as NFT 112 is used to focus the energy 204 instead of an optical device such as a lens or mirror. This is because the desired size of the hotspot 208 is smaller than a half-wavelength of the energy 204, and as a result optical devices are diffraction limited at this scale. As a result, the energy 204 is focused on the NFT 112, which is made of a material (e.g., Au, Ag, Cu, Al) that emits a field of surface plasmons at resonance. The NFT 112 is shaped to direct the plasmon field to the surface of the medium 202.

The energy applied to the NFT 112 to create the hotspot 208 can also cause a significant temperature rise in the NFT 112. The NFT 112 may be formed as a peg, pin, bar, or other protrusion having relatively small dimensions in order to keep the generated plasmonic field small. As a result, a heat sink 218 may be formed proximate to (or integral with) the NFT 112. The heat sink 218 may draw heat away from the NFT 112, and be thermally coupled to other components (e.g., the write pole 206) in order to dissipate the heat.

In the discussion that follows (including the analysis results shown in FIGS. 5, 6A-6C, 8, 9A and 9B) the NFT 112 is configured as a circular disk (lying on the x-y plane) at an excitation location 112a, which is coupled to a peg that extends from the disk to the ABS 108 at near field generation portion 112b. This NFT 112 may be referred to herein as the "lollipop" NFT configuration. An example of a lollipop NFT 112 can be seen in US Patent Publication 2010/0123965, filed Nov. 18, 2008. In another arrangement (e.g., analysis results shown in FIG. 9C), an NFT is configured as side-by-side plates with a gap therebetween. The plates lie on the x-y plane, and the gap runs in the y-direction from the excitation location 112a to the near field generation portion 112b. This arrangement is referred to herein as the "gap" NFT. An example of a gap NFT can be seen in U.S. patent application Ser. No. 13/231,546, filed on Sep. 13, 2011.

The energy carried by the waveguide 110 includes orthogonal electric fields (E-field) and magnetic fields (B-field). In order to provide high coupling efficiency, the waveguide 110 is arranged to provide a strong optical E-field amplitude incident to the NFT excitation location 112a, which is a portion of the NFT 112 facing away from the ABS 108 onto which the waveguide 110 focuses energy. However, if the NFT 112 (in the "lollipop" configuration) is immersed into high index core 210 of waveguide (e.g., n=2.08), the near field generation portion 112b of the NFT 112 (e.g., portion of the NFT 112 closest to the ABS 108) may need to be significantly reduced in size to avoid a red shift of excitation for predetermined wavelength where the optical field is peaked. Instead, as shown in FIG. 2, the NFT 112 is positioned in the relatively lower index material of the top cladding 212 (e.g. n=1.65). This location may also offer benefits in terms of fabrication, heat sinking, etc.

In order to optimize coupling between the waveguide 110 and the NFT 112, the optical mode profile can be skewed towards the side where the NFT is located. This is the approach illustrated in FIG. 2. The NFT 112 is located in the top cladding layer 212, which has a higher index of refraction than the bottom cladding layer 214. For example, the top cladding layer 212 may be formed from a material such as $Al_2O_3$, $SiO_xN_y$ (n=1.65), and the bottom cladding 214 may be formed from a lower index material, e.g. $SiO_2$ (n=1.47). Both of these are lower than the index of the core (e.g., n=2.08).

In the arrangement illustrated in FIG. 2, the core 210 may be formed from a single material. In an alternate arrangement shown in FIG. 3, a waveguide 302 includes a core 304 with multiple layers of different index material (e.g., double layer core or index gradient core). The top and bottom claddings 212, 214 may be of differing index materials as described above. For example, top cladding layer 212 may have a higher index of refraction than bottom cladding layer 214. Generally, the layers of core 304 may each include indices of refraction that are ordered from largest to smallest based on respective proximity to the top and bottom cladding layers 212, 214.

Figure 3:
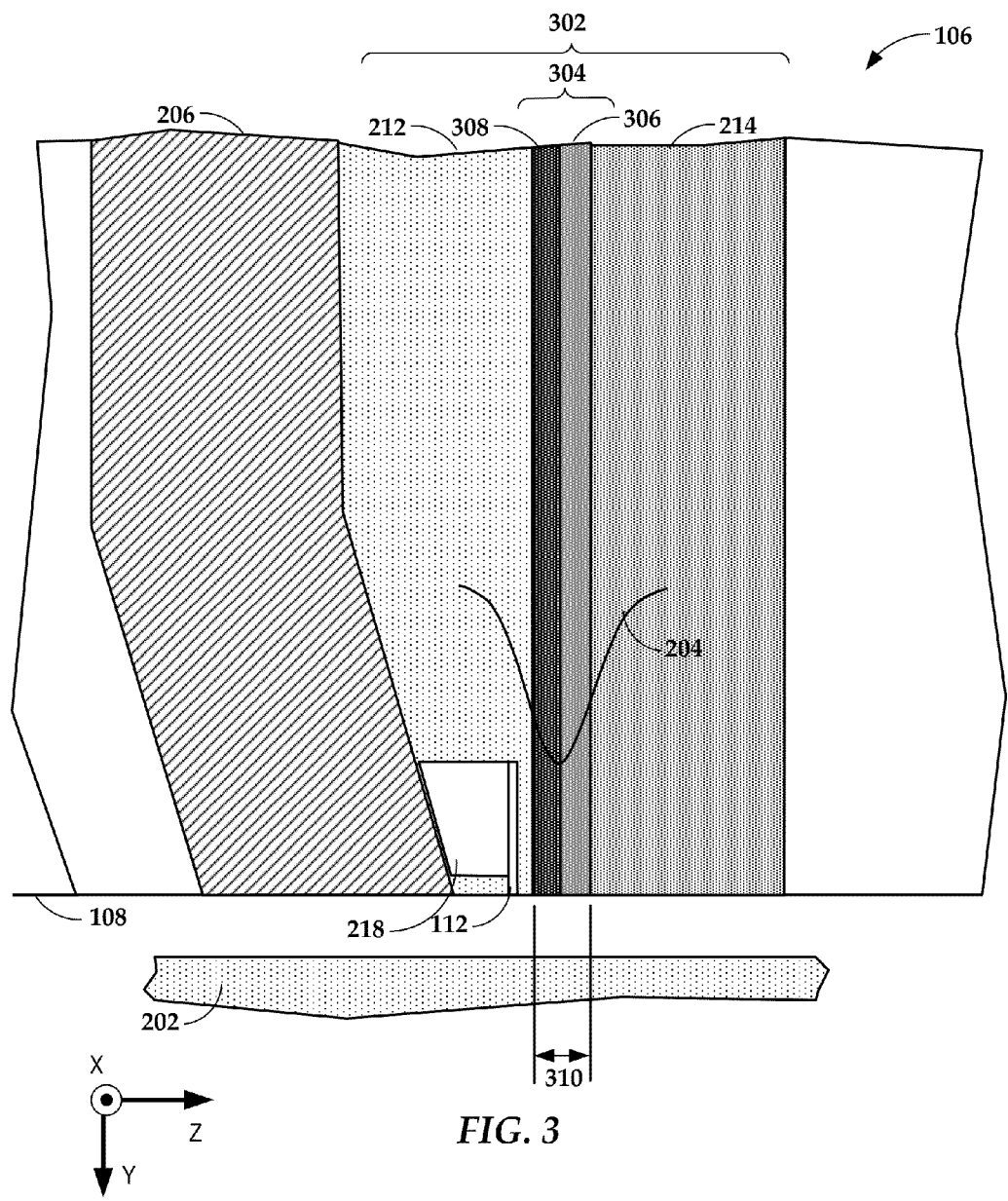
FIG. 3 is a cross-sectional view of a waveguide, write pole, and near-field transducer according to another example embodiment.

In the arrangement shown in FIG. 3, the core 304 may be formed from a first layer 306 of lower index material such as $Ta_2O_5$ (n=2.1) near the bottom cladding 214, and a second layer 308 of higher index material such as $TiO_2$ or $Nb_2O_5$ (n=2.4) near the top cladding 212. If the thickness 310 of the core 302 is on the order of 125 nm, then the core may support single mode optical propagation. For example, if the thickness of the lower index layer 306 is around 90 nm, and around 40 nm for the higher index layer 308 (for a total thickness 310 of around 130 nm), the excitation portion of the NFT 112 may receive up to 31% more energy from the wave-front compared to a single core structure shown in the arrangement of FIG. 2.

Figure 4:
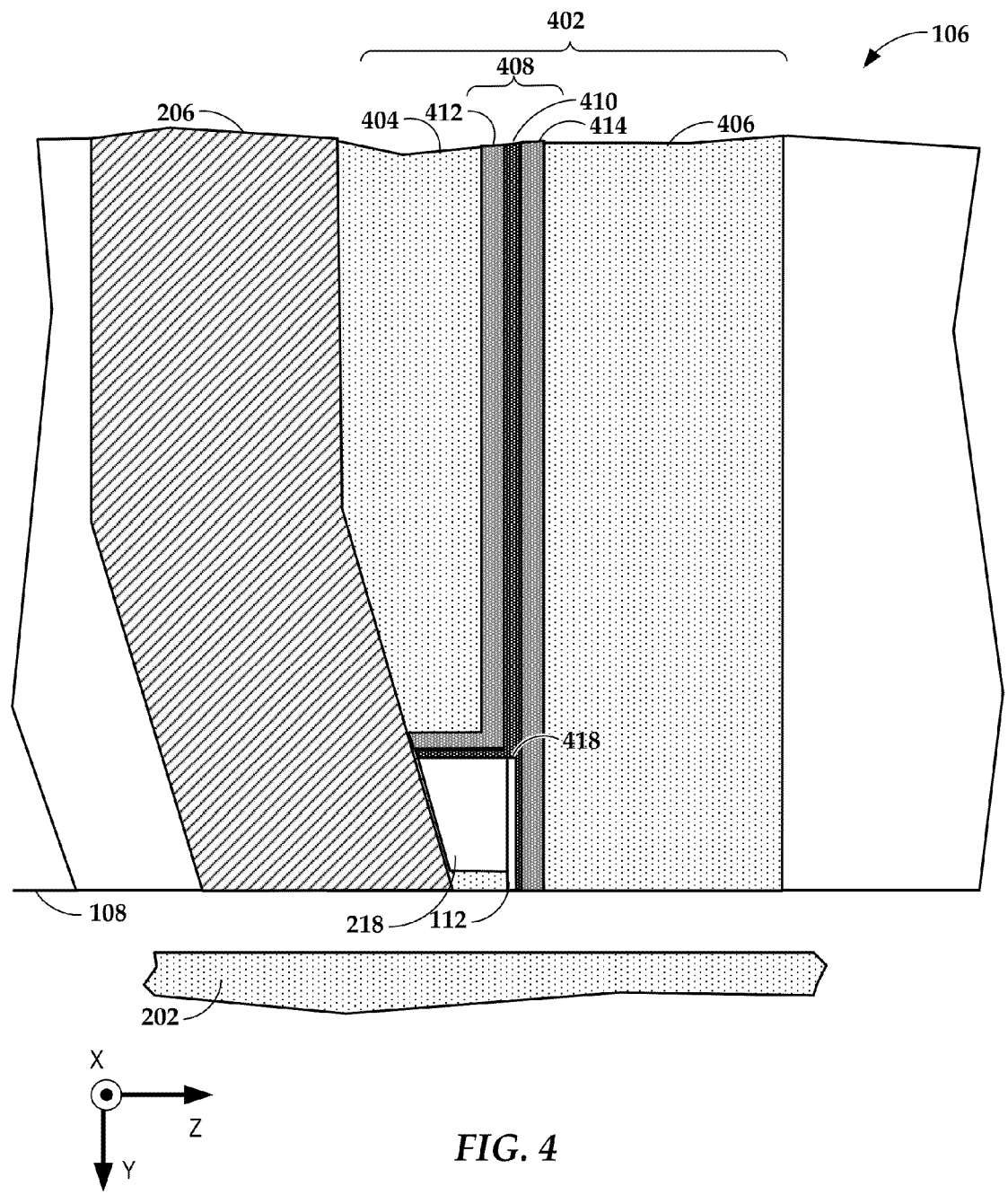
FIG. 4 is a cross-sectional view of a waveguide, write pole, and near-field transducer according to another example embodiment.

In reference now to FIG. 4, a waveguide and NFT arrangement is illustrated according to another example embodiment. In this example, a waveguide 402 includes top and bottom cladding layers 404, 406 both using a low index material such as $SiO_2$ (n=1.47). Between these layers 404, 406 is a core 408 formed from a "sandwich" with a middle layer 410 (e.g., $Al_2O_3$ or $SiO_xN_y$, n=1.65) surrounded with a higher index first and second outside core layers 412, 414 ($TiO_2$ or $Nb_2O_5$, n=2.4). All of the layers 410, 412, 414 may be substantially the same thickness in the z-direction, e.g., 40 nm. The middle layer 410 (as well as outside core layer 412) optionally extends over a back edge of the NFT 112, e.g., edge 418 that faces away from the media-facing surface (e.g., the ABS 108). Placing the NFT 112 in the middle layer 410 helps to preserve resonant shape and size. In such a case, the excitation portion of the NFT 112 may receive up to 94% more energy from the wave-front compared a single core structure shown in the arrangement of FIG. 2.

Figure 5:
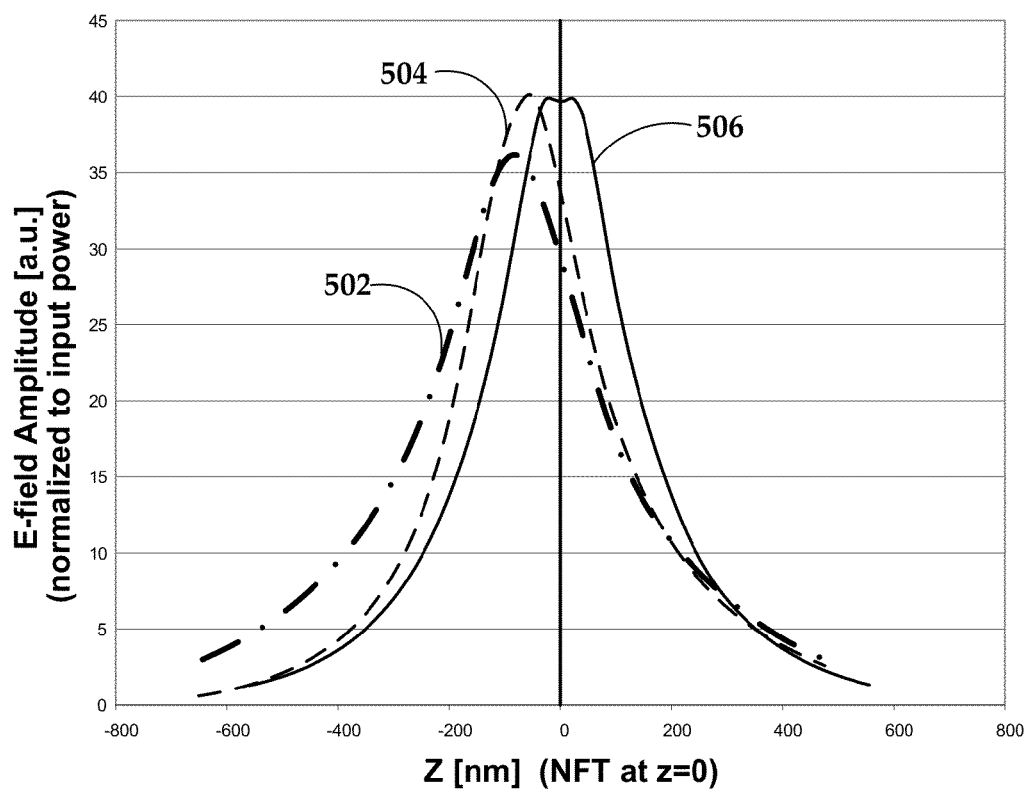
FIG. 5 is a graph of E-field amplitude at the near field transducer for waveguide arrangements shown in FIGS. 2-5.

In reference now to FIG. 5, a graph illustrates results of an E-field amplitude analysis for single, double and triple core structures as shown in FIGS. 2-4, respectively. In this analysis, the NFT 112 is located at z=0 and converts the E-field received from the waveguide to near field resonance. The input energy is unified to the same for all the cases. Curve 502 represents E-field intensity of the single layer core structure shown in FIG. 2. Curve 504 represents the E-field intensity of the double core shown in FIG. 3. Curve 504 is skewed by the double core structure (e.g., core 304 in FIG. 3) towards top cladding 21, which increases the NFT efficiency at z=0 compared to curve 502. The E-field intensity of the triple core structure of FIG. 4 is represented by curve 506. Curve 506 has maximum E-field intensity in the NFT center (e.g., z=0), while still allowing the NFT to be immersed in a low index material, which decreases red shift excitation.

Figure 6A:
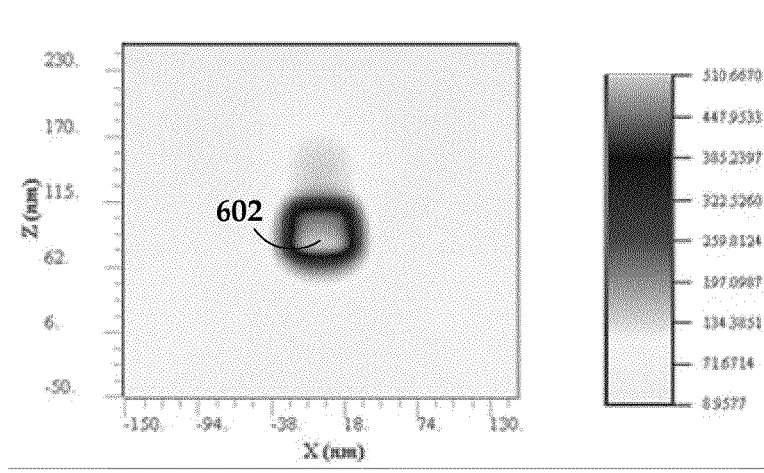
FIGS. 6A-6C are graphs illustrating near-field transducer to media thermal efficiency for waveguide arrangements shown in FIGS. 2-5.
Figure 6B:
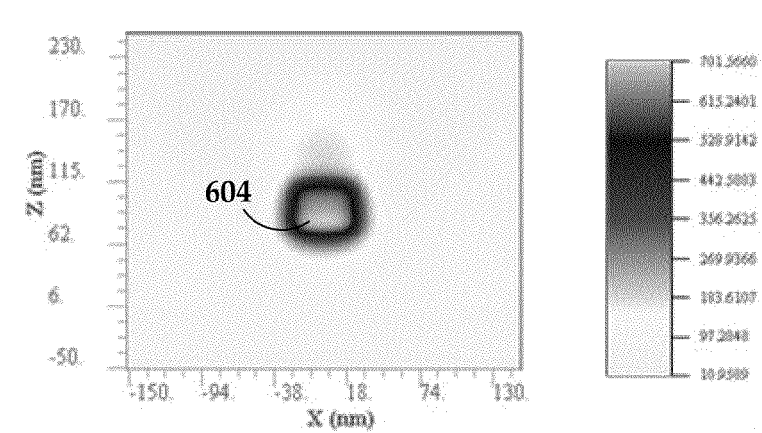
Figure 6C:
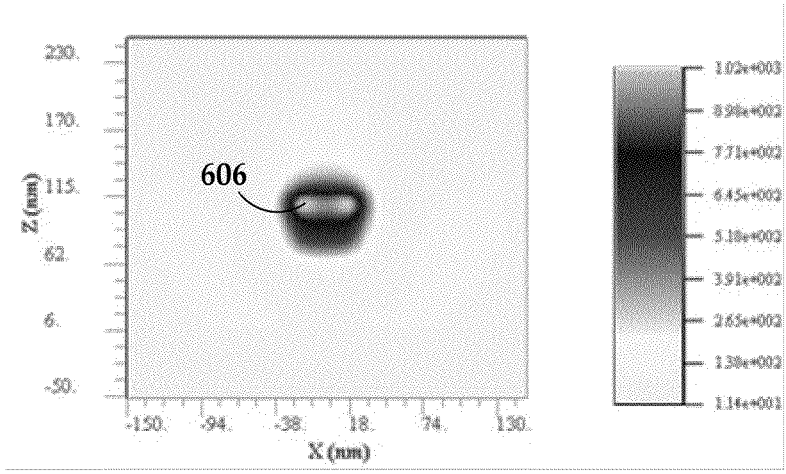

In reference now to FIGS. 6A-6C, graphs show results of finite-difference time domain (FDTD) modeling of the waveguide arrangements shown in FIGS. 2-4. For this analysis, the media 202 is modeled with a head media spacing of 8 nm, n=1.2116)/FePtCuC medium (12.6 nm thick, n=2.94+j 1.527) on a MgO (10 nm thick, n=1.70)/Si substrate. The NFT 112 was modeled as a gold disk of 200 nm in diameter. The NFT 112 includes a peg (16 nm long, 40 nm wide, and 32 nm thick) directed towards the ABS 108. The NFT 112 is heat-sinked to a sloped magnetic pole 260 (250 nm wide, slope angle=26.6 degrees). The pole-peg spacing at the peg end is 20-nm. The curves in FIG. 6A-C represent the light absorption profiles at the middle of the recording layer. The z-axis represents the downtrack direction, and the x-axis represents the cross track direction.

In FIG. 6A, the peak absorption of 510 W/$\mu m^3$ for a single core arrangement (e.g., as is shown in FIG. 2) is seen in region 602. By way of comparison, for the double and triple core designs of FIGS. 3 and 4, the peak absorption values are 700 and 1020 W/$\mu m^3$ in regions 604 and 606 of FIGS. 6B and 6C. This analysis shows that the double core enhances the efficiency by 37%, and the triple core increases the efficiency by 100%, which is consistent with incident field estimation shown in FIG. 5. It should also be noted that region 606 has an increased thermal gradient in the downtrack direction (z-direction), which enables writing smaller-sized bits in the downtrack direction.

In view of the results above, a number of other simulations were run using various combinations of materials and geometries similar to the triple core design shown in FIG. 4. In addition, a variation of the embodiment shown in FIG. 4 was tested, and is shown by way of example in the cross-sectional diagram of FIG. 7. In this example, a waveguide 702 includes top and bottom cladding layers 704, 706 that both use a low index material (1.47≦n≦1.65). Between these layers 704, 706 is a core 708 similar to the core 408 shown in FIG. 4, except that core 708 includes a middle layer 710 and an outside layer 712, and the NFT 112 is disposed in middle layer 710. Middle layer 710 may optionally extend over the back edge 418 of the near field transducer 112 as previously described. Outside layer 712 may be a single or double core having an index of refraction at least greater than that of portion 710.

Figure 7:
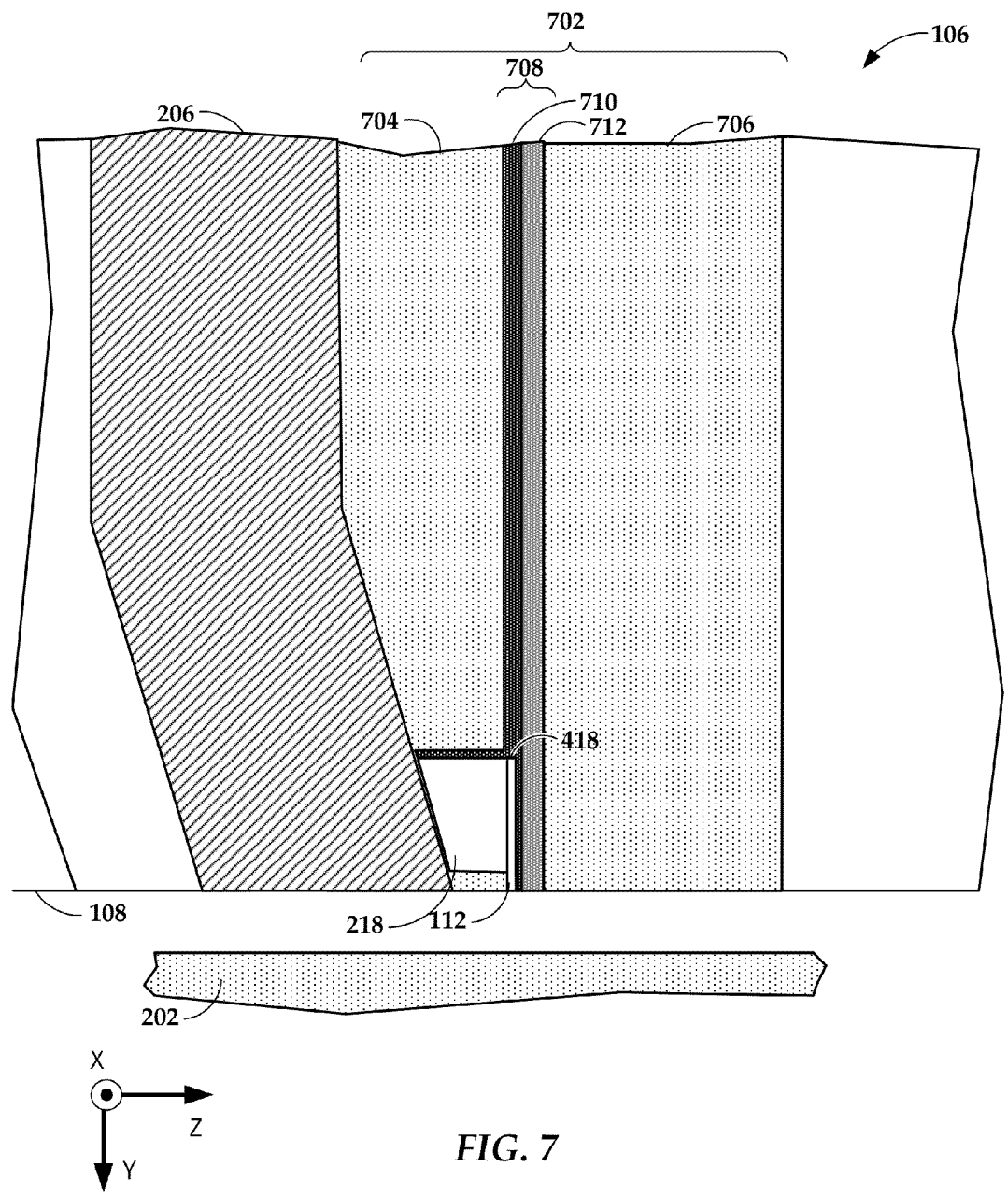
FIG. 7 is a cross-sectional view of a waveguide, write pole, and near-field transducer according to another example embodiment.

For purposes of further discussion, the configuration shown in FIG. 7 will be referred to as the "out-of-center NFT," and the configuration shown in FIG. 4 will be referred to as "in-center NFT." In both configurations, a middle core layer encompasses the back edge 418 of the NFT 112. The in-center version shown in FIG. 4, the middle layer is separated from the cladding 404 by outside layer 412. In the out-of-center configuration shown in FIG. 7, there is no other core layer that separates the middle layer 710 from the cladding 704. In FIG. 8, a chart 800 summarizes analyses results for in-center and out-of-center configurations according to example embodiments. Properties of materials in the chart 800 are shown in Table 1 below.

TABLE 1

Properties of materials shown in FIG. 8

| Material | Refractive Index | Loss [dB/cm] | Thermal Conductivity [W/m/K] |
|---|---|---|---|
| $Al_2O_3$ | 1.65 | 5 | 1.8 |
| $Ta_2O_5$ | 2.1 | 1 | 0.9 |
| $TiO_x$ or doped $TiO_x$ | 2.3 | 1-2 (thickness & doping dependent) | TBD |
| $Y_2O_3$ | 1.9 | 2 | 1.7 |
| $SiO_2$ | 1.47 | n/a | 1.2 |

Each row of the chart represents a different configuration of cladding and core materials, core layer thicknesses (in the "Dimensions" column), NFT-to-bottom-cladding spacing, and in-center or out-of-center arrangement. The first row represents a baseline measurement from which to compare the energy transfer efficiency of the other configurations (the efficiencies have been locally optimized for each configuration). The baseline configuration has the NFT embedded in the top cladding 25 nm from the core (e.g., core is 125 nm thick, and NFT is 145 nm from bottom cladding).

The measure of energy efficiency used in chart 800 is the ratio of optical coupling efficiency (CE) divided by the increase in temperature of the NFT. The best performing in-center design (199.5% improvement over baseline) is at Row 3, designation by reference numeral 802. This configuration has bottom and top cladding of $SiO_2$ and a three layer core of $TiO_x$, $Y_2O_3$, and $TiO_x$ with respective thicknesses of 50, 40, and 50 nm. The NFT 112 is located in the middle $Y_2O_3$ layer. The best performing out-of-center design (179.1% improvement over baseline) is at Row 7, and designated by reference numeral 804. This configuration 804 has bottom and top cladding of $SiO_2$ and a three layer core of $Ta_2O_5$, $TiO_x$, and $Y_2O_3$ with respective thicknesses of 40, 40, and 75 nm. The NFT 112 is located in the bottom $Y_2O_3$ layer. Note that in both of these cases 802, 804, the cladding is symmetric, e.g., formed from the same refractive index materials on both the top and bottom cladding layers.

Figure 9A:
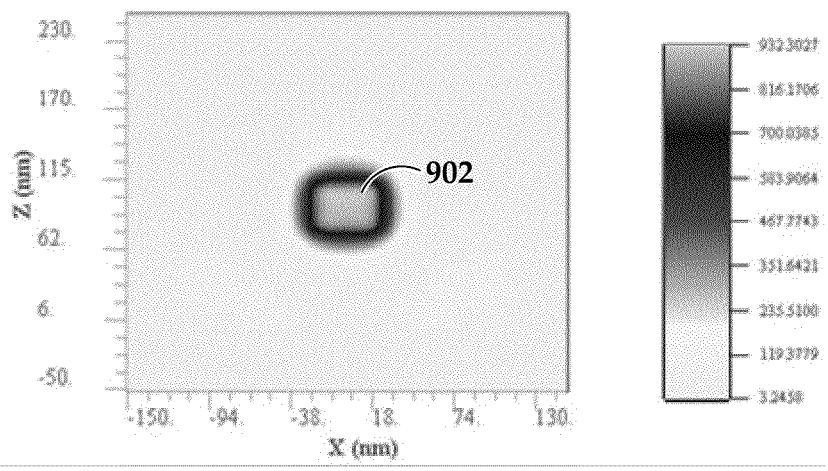
FIGS. 9A-9C are graphs illustrating near-field transducer to media thermal efficiency for additional waveguide arrangements according to example embodiments.
Figure 9B:
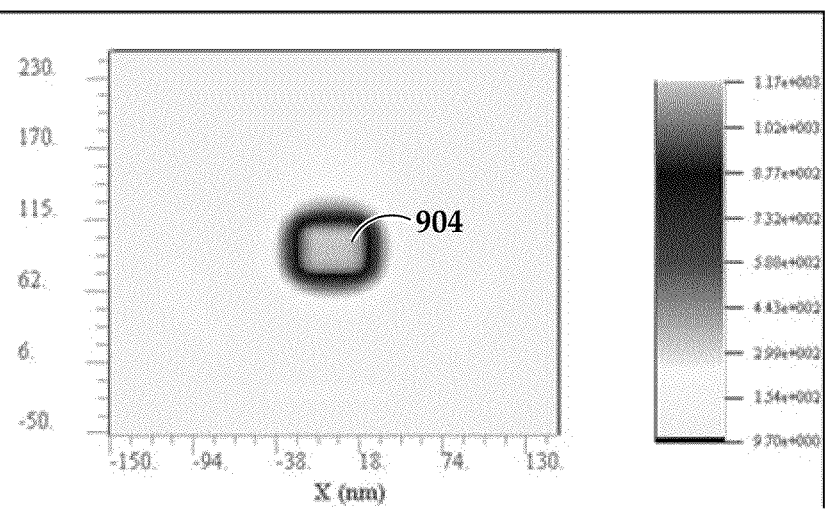

In reference now to FIGS. 9A and 9B, graphs illustrate the NFT-to-thermal efficiency at the media of configurations 802, 804 of FIG. 8. In FIG. 9A, the maximum energy absorption is 923 W/$\mu m^3$ at region 902. In FIG. 9B, the maximum energy absorption is 1170 W/$\mu m^3$ at region 904. The results in FIGS. 9A and 9B represent respective increases of 83% and 129% in NFT-to-thermal efficiency over the baseline case.

Figure 9C:
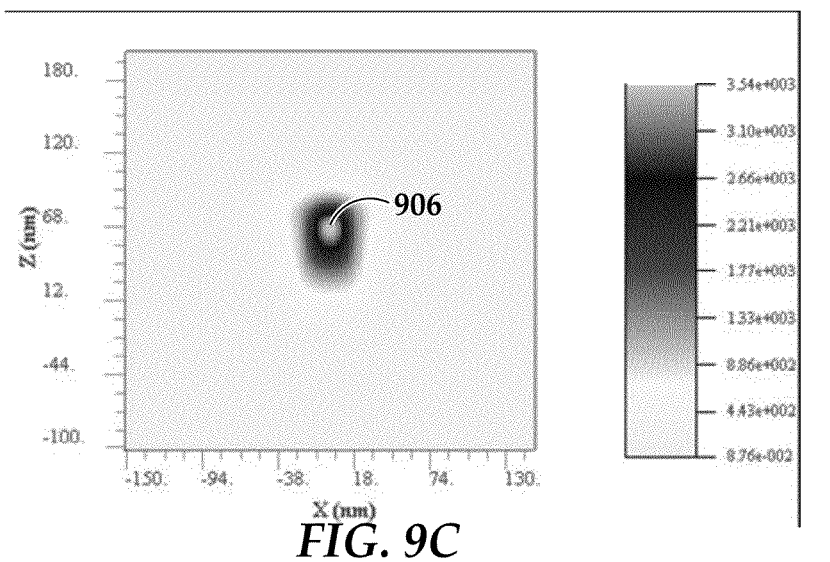

Another analysis of a laminated waveguide structure was performed. In this case, the NFT was configured as a gap NFT as described above. In this case, the waveguide as configured as follows: bottom cladding, $SiO_2$ (n=1.47), two-layer core with a 90 nm layer of TaO (n=2.1) near the bottom cladding and a 60 nm layer of TiO (n=2.3) near the top cladding. The top cladding was AlO (n=1.65). The NFT is located within a truncated core, and so light is directly incident on backside of the NFT. Even so, it may be desirable to have higher amount of light concentrated on a top of the NFT (e.g., surface facing the top cladding layer and write pole). As a result, a laminated core can help on shift energy in this direction. This configuration results in a 41% increase in optical efficiency at the NFT, and a 20% increase in NFT-to-thermal efficiency at the media compared to the baseline configuration (e.g., single TaOx core, top and bottom cladding of $Al_2O_3$). The graph in FIG. 9C illustrates the NFT-to-thermal efficiency of this case, with a maximum energy absorption of 3540 W/μm³ at region 906. Note the small hotspot and high thermal gradient compared to FIGS. 9A and 9B. As FIG. 9C shows, a laminated core configuration not only benefits a lollipop NFT configuration, but a gap NFT configuration as well.

While the analysis above indicates relative performance of some of the illustrated embodiments, it should be noted that these results are obtained using assumptions that can change for different applications. As a result, some of the illustrated configurations may perform differently relative to each other as these design assumptions change. For example, available laser power, wavelength of light, media and head configuration, NFT design, and a number of other factors may cause some designs to perform differently than shown here. Generally, any combination of high index materials (e.g., $TiO_2$, $Nb_2O_5$, $Ta_2O_5$, $HfO_2$, $ZrO$) may be used for the core layer, as well as their metal doped complex oxides. Core layer thicknesses may range from 20 nm to 150 nm in order to provide single mode at 830 nm wavelength light. Low index materials that may be used for upper, lower, and/or middle cladding layers include $SiO_2$, $Al_2O_3$, $Y_2O_3$, $MgO$, $SiOxNy$, metals (Ti, Ta, Nb, Hf, Zr, Y), doped silicon-based oxide/oxynitrides/metals (Ti, Ta, Nb, Hf, Zr, Y), and doped aluminum-based oxide and oxynitride. The mid-clad thickness for double core structures may range from 20 nm to 60 nm.

Figure 10:
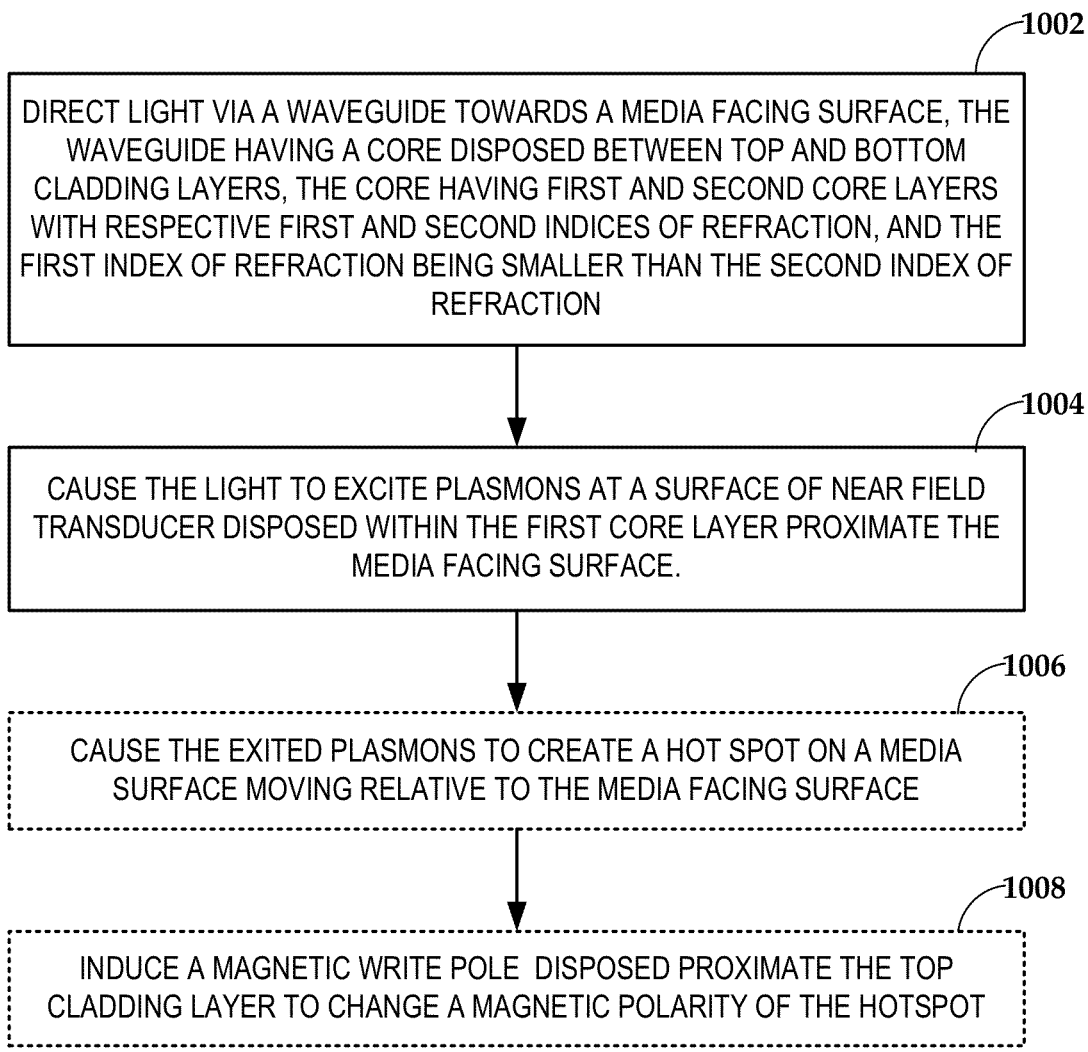
FIG. 10 is a flowchart illustrating a procedure according to an example embodiment.

In reference now to FIG. 10, a flowchart illustrates a procedure for providing light to a NFT of a HAMR device (or other device utilizing optical energy for the heating of media). The procedure involves directing 1002 light via a waveguide towards a media-facing surface. The waveguide includes a core disposed between top and bottom cladding layers. The core includes first and second core layers having respective first and second indices of refraction. The first index of refraction is smaller than the second index of refraction.

The light is caused 1004 to excite plasmons at a surface of near field transducer disposed within the first core layer proximate the media-facing surface. This may cause 1006 the exited plasmons to create a hot spot on a media surface moving relative to the media-facing surface. In such a case, a magnetic write pole disposed proximate the top cladding layer is induced 1008 to change a magnetic polarity of the hotspot.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
    a waveguide extending away from a media-facing surface, the waveguide comprising top and bottom cladding layers and a core disposed therebetween, wherein the core comprises a middle core layer and an outside core layer having respective first and second indices of refraction, and wherein the first index of refraction is smaller than the second index of refraction; and
    a near field transducer disposed within the middle core layer and proximate the media-facing surface, wherein at least the middle core layer extends over a back edge of the near field transducer that faces away from the media-facing surface.

2. The apparatus of claim 1, further comprising a second outside layer disposed between the middle core layer and the top cladding layer, wherein the second outside layer has a third index of refraction that is larger than the first index of refraction.

3. An apparatus comprising:
    a waveguide extending away from a media-facing surface, the waveguide comprising top and bottom cladding layers and a core disposed therebetween, wherein the core comprises:
    a middle core layer;
    an outside core layer having respective first and second indices of refraction,
    wherein the first index of refraction is smaller than the second index of refraction; and
    a second outside layer disposed between the middle core layer and the top cladding layer, wherein the second outside layer has a third index of refraction that is larger than the first index of refraction; and
    a near field transducer disposed within the middle core layer and proximate the media-facing surface.

4. The apparatus of claim 3, wherein the third index of refraction is the same as the second index of refraction.

5. An apparatus, comprising:
    a waveguide extending away from a media-facing surface, the waveguide comprising top and bottom cladding layers and a core disposed therebetween, wherein the core comprises a middle core layer and an outside core layer having respective first and second indices of refraction, wherein the first index of refraction is smaller than the second index of refraction; and
    a near field transducer disposed within the middle core layer and proximate the media-facing surface, wherein the first index of refraction is chosen to minimize a red shift in excitation of the near field transducer in response to energy received via the waveguide.

6. The apparatus of claim 1, wherein indices of refraction of the top and bottom cladding layers are equal to each other and lower than the first and second indices of refraction.

7. The apparatus of claim 1, further comprising a magnetic write pole proximate the top cladding layer.

8. A method, comprising:
    directing light via a waveguide towards a media-facing surface, wherein the waveguide comprises top and bottom cladding layers and a core disposed therebetween, wherein the core comprises a middle core layer and an outside core layer having respective first and second indices of refraction, wherein the first index of refraction is smaller than the second index of refraction; and
    causing the light to excite plasmons at a surface of a near field transducer disposed within the middle core layer proximate the media-facing surface, wherein the first index of refraction is chosen to minimize a red shift in excitation of the near field transducer in response to energy received via the waveguide.

9. The method of claim 8, wherein at least the middle core layer extends over a back edge of the near field transducer that faces away from the media-facing surface.

10. The method of claim 9, wherein the core comprises a second outside layer disposed between the middle core layer and the top cladding layer, wherein the second outside layer has a third index of refraction that is larger than the first index of refraction.

11. The method of claim 8, wherein the core comprises a second outside layer disposed between the middle core layer and the top cladding layer, wherein the second outside layer has a third index of refraction that is larger than the first index of refraction.

12. The method of claim 11, wherein the third index of refraction is the same as the second index of refraction.

13. The method of claim 8, further comprising:
  causing the exited plasmons to create a hot spot on a media surface moving relative to the media-facing surface; and
  inducing a magnetic write pole disposed proximate the top cladding layer to change a magnetic polarity of the hotspot.

14. The method of claim 8, wherein indices of refraction of the top and bottom cladding layers are equal to each other and lower than the first and second indices of refraction.

15. An apparatus, comprising:
  a waveguide extending away from a media-facing surface, the waveguide comprising top and bottom cladding layers and a core disposed therebetween, wherein the top and bottom cladding layers have respective top and bottom indices of refraction, wherein the top index of refraction is higher than the bottom index of refraction, wherein the core has a higher index of refraction than both the top and bottom indices of refraction, and wherein the core has at least two layers of differing index of refraction, the at least two layers comprising indices of refraction that are ordered from largest to smallest based on respective proximity to the top and bottom cladding layers; and
  a near-field transducer disposed in the top cladding layer proximate the media-facing surface.

16. The apparatus of claim 15, further comprising a magnetic write pole proximate the top cladding layer.

17. The apparatus of claim 15, wherein at least one of the core layers extends over a back edge of the near field transducer that faces away from the media-facing surface.

* * * * *

UNITED STATES PATENT AND TRADEMARK OFFICE
CERTIFICATE OF CORRECTION

PATENT NO. : 8,509,037 B1  
APPLICATION NO. : 13/454999  
DATED : August 13, 2013  
INVENTOR(S) : Xiaoyue Huang and Chubing Peng Page 1 of 1

It is certified that error appears in the above-identified patent and that said Letters Patent is hereby corrected as shown below:

In the Claims

Column 9, line 7, Claim 13: "the exited plasmons" should read --the excited plasmons--.

Signed and Sealed this
Twelfth Day of November, 2013

Teresa Stanek Rea
*Deputy Director of the United States Patent and Trademark Office*